United States Patent

[11] 3,548,867

[72] Inventors Hans Theodor Grisebach
Lunen;
Walter Weirich, Dortmund, Germany
[21] Appl. No. 824,073
[22] Filed May 13, 1969
[45] Patented Dec. 22, 1970
[73] Assignee Gewerkschaft Eisenhutte Westfalia
Wethmar, near Lunen, Westfalia, Germany
a body corporate of Germany
[32] Priority June 10, 1968
[33] Germany
[31] No. 1,750,834

[54] PRESSURE RELIEF DEVICES
4 Claims, 3 Drawing Figs.
[52] U.S. Cl. .................................................. 137/494,
137/512.2, 137/512.5, 137/538
[51] Int. Cl. ........................................................ F16k 17/04
[50] Field of Search........................................... 137/494,
(Inquired), 535, 538, 512.2, 512.5, 512

[56] References Cited
UNITED STATES PATENTS
| | | | |
|---|---|---|---|
| 1,603,514 | 10/1926 | Carter.......................... | 137/494 |
| 2,005,813 | 6/1935 | Thorsen ....................... | 137/538X |
| 2,033,839 | 3/1936 | Lawson........................ | 137/538X |
| 2,825,309 | 3/1958 | Geiger.......................... | 137/494X |
| 3,482,594 | 12/1969 | Simon........................... | 137/538 |

*Primary Examiner*—M. Cary Nelson
*Assistant Examiner*—Robert J. Miller
*Attorney*—Sughrue, Rothwell, Mion, Zinn & Macpeak ABSTRACT: A pressure-relief device in the form of a piston slidably mounted in a bore of a housing, an o-ring being provided between the bore and the piston. The piston has a longitudinal bore extending completely through the piston which bore communicates with radial bores which can be moved inwardly beyond the O-ring against the force of a spring to permit a through flow of pressure fluid. The inner most end of the longitudinal bore is normally closed by a pressure member transmitting the spring force to the piston, the pressure member being separable from the piston. When the pressure within the longitudinal bore reaches a certain value.

3,548,867

PRESSURE RELIEF DEVICES

BACKGROUND OF THE INVENTION

Pressure relief devices are known for example in mineral mining. A known device which has been used quite extensively is composed of a housing provided within a bore containing a piston the outer working face of which is exposed to pressure fluid to be controlled. The piston has a longitudinal bore extending inwardly from its working face to communicate with a number of radial bores extending to the peripheral surface of the piston. When the pressure acting on the working face of the piston exceeds a certain value the piston is displaced into the housing against the force of a spring until the radial bores are positioned inwardly of an O-ring disposed between the bore and the piston. Whereupon pressure fluid can pass through the device to relieve the pressure. In this known device an annular gap of constant dimensions is formed inwardly beyond the O-ring. The back or reaction pressure produced in the gap defines the maximum rate of flow of pressure fluid when the device operates. In the case of excessive pressure, due for example to a rock fall in a mineral mine, the excessive pressure cannot be reduced quickly enough by the device and consequently damage occurs.

An object of this invention is to provide an improved device which will overcome this disadvantage.

A further object of the invention is to modify the known device as little as possible to achieve this result.

SUMMARY OF THE INVENTION

In the known pressure relief device of the aforementioned kind which has a pressure member transmitting the spring force to the piston the invention provides that the longitudinal bore extends completely through the piston and is closed at its innermost end by the pressure member under normal conditions.

With a device made in accordance with the invention two valves are effectively provided in cascade. The second valve is a safety valve which only responds at excessive pressures greater than that at which the first valve responds. Generally speaking, the working area of the second valve formed by the closure of the longitudinal bore is smaller than the working areas of the piston outer face. Thus, only if excessive pressure occurs are the piston and the pressure member separated to provide an increased rate of throughflow for the pressure medium.

In order that the pressure member shall not load the piston nonuniformly a spherical or conical sealing means is preferably formed between the pressure member and the piston. The nature of the sealing means is immaterial; for example a steel-synthetic plastics joint or even a steel on steel joint can be used.

To ensure that the piston and pressure member reliably separate at excessive pressure the stroke of the piston can be limited by the provision of inter-engageable abutment faces on the piston and the wall of the bore in the housing.

BRIEF DESCRIPTION OF DRAWING

Constructional embodiments of the present invention will now be described by way of examples only, with reference to the accompanying drawing wherein.

DESCRIPTION OF PREFERRED EMBODIMENTS

Figure 1:
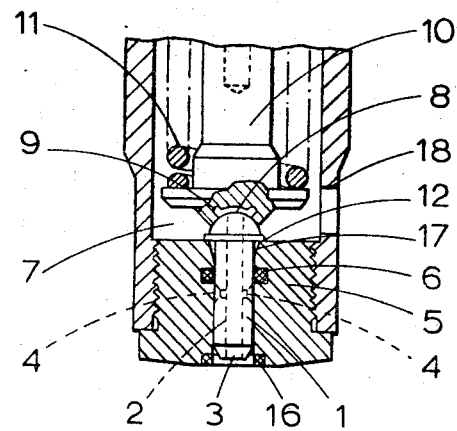
FIG. 1 is a part sectional side view of a device made in accordance with the invention.

In the embodiment shown in FIG. 1 a housing or body 5, which may be made in two parts as shown, has a cylindrical bore 2 which receives a valve piston 1 for slidable displacement therein. The piston 1 has a longitudinal bore 3 which communicates with a number of radial bores 4 terminating at the peripheral surface of the piston 1. The wall of the bore 2 is provided with groove in which O-rings 6, 16 are sealed. The O-rings 16 is positioned near the outermost working face of the piston 1 and the O-rings 6 is positioned inwardly therefrom.

The body 5 contains a chamber 7 having a defining radial surface 12 adjoining the innermost end of the bore 2.

This innermost end of the bore 2 is tapered to increase in diameter over a portion 17. The body 5 has an outlet 18 communicating with the chamber 7. A pressure member 10 is disposed in the chamber 7 and transmits the force of a compression spring 11 to the piston 1.

The O-ring 6 permits pressure fluid to pass from the working face of the piston 1 to the chamber 7 and the outlet 18 via the bores 3, 4 when the pressure acting on the working face of the piston 1 is sufficiently high to overcome the force of the spring 11 and raise the piston 1 until the bores 4 are disposed above the O-ring 6.

The operation of the device described so far is known per se.

In accordance with the invention the bore 3 communicates with a chamber 8 which is normally closed off from the chamber 7 by sealing means 9. The compression spring 11 acting on the pressure member 10 serves to maintain the chamber 8 sealed relative to the chamber 7 during normal conditions and defines the setting of the device. The effective working area of the chamber 8 is smaller than the working area of the piston 1 so that the sealing means 9 will separate from the chamber 8 to permit pressure fluid to enter the chamber 7 directly through the bore 3 only when the chamber 8 is subjected to pressure fluid at a pressure substantially higher than that necessary to displace the piston 1. Thus, the valve constituted inter alia by the chamber 8 only opens when the pressure rises decisively to a dangerous level.

Figure 2:
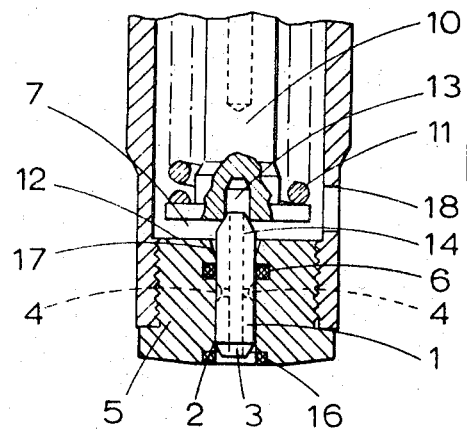
FIG. 2 is a part sectional side view of another device made in accordance with the invention.

In FIG. 2 like reference numerals denote like parts to those shown in FIG. 1. In contrast to FIG. 1 the innermost end of the piston 1 is tapered to reduce in diameter and form a frustoconical portion 14. A bore 13 is provided in the pressure member 10 and the lower part of this bore 13 forms a seating in which the portion 14 of the piston 1 is received. The operation of the device shown in FIG. 2 is the same as that of the device shown in FIG. 1.

Figure 3:
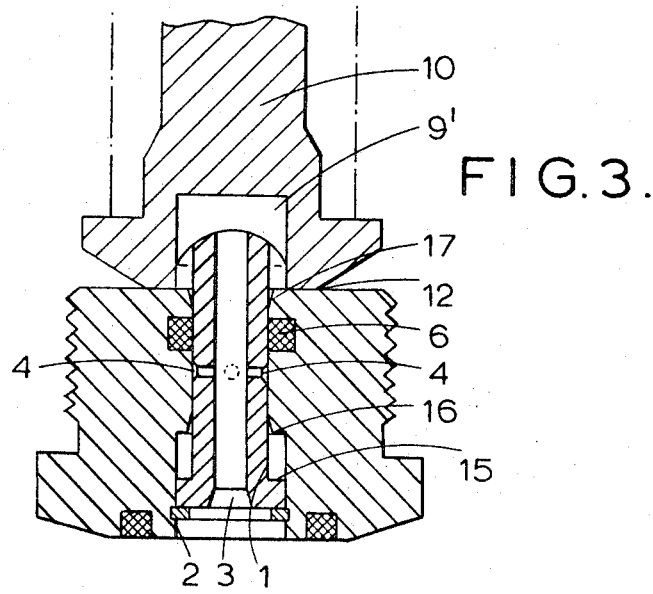
FIG. 3 is a part sectional side view of part of a further device made in accordance with the invention.

Again in FIG. 3 like reference numerals denote like parts to those shown in FIGS. 1 and 2. Apart from some relatively minor differences in construction the device of FIG. 3 has its piston 1 provided with a stepped abutment face 15 engageable with a corresponding abutment face 16 on the wall of the bore 2. In this way the stroke of the piston 2 is limited. When the pressure of the fluid reaches a certain value the piston 1 and a sealing surface 9' for the bore 3 are raised. Excessive pressure will however separate the surface 9' from the bore 3 to permit a more rapid through flow of fluid.

In each embodiment the invention provides with an advantageous modification of the known device a device able to provide a large through flow passage in case of need.

We claim:

1. In a hydraulic pressure relief device with a housing provided with a bore, a piston mounted for sliding in the bore the piston having a longitudinal bore extending inwardly of an outlet working face of the piston and communicating with one or more radial bores, an O-ring positioned between the piston and the bore and disposed inwardly of the working face of the piston a pressure member disposed in the housing and a spring urging said pressure member into engagement with the piston, the improvement comprising the longitudinal bore extends completely through the piston and sealing means between the pressure member and the piston serving to close the innermost end of the bore under normal conditions.

2. A device according to claim 1 wherein the effective working area of the closure of the longitudinal bore by said sealing means is smaller than the working area of the piston.

3. A device according to claim 1 wherein the piston has an abutment face which is engageable with an abutment face of the bore to limit the stroke of the piston.

4. A hydraulic pressure relief device comprising:
   a. a housing provided with a bore and a communicating chamber;
   b. a piston mounted in the bore for slidable movement therein the piston having an outer working face for exposure to pressure fluid;
   c. an O-ring disposed between the piston and the bore in the housing and positioned inwardly of the outer end of the bore in the housing;
   d. a longitudinal axial bore extending through the piston and communicating with one or more radial bores disposed inwardly of the working face of the piston;
   e. a pressure member disposed in the chamber of the housing; and
   f. a spring urging the pressure member against the piston so as to close the innermost end of the longitudinal bore therein.